United States Patent
Ramos et al.

(10) Patent No.: US 6,430,767 B1
(45) Date of Patent: Aug. 13, 2002

(54) TOOL FOR INSTALLING EMITTERS FOR DRIP IRRIGATION

(76) Inventors: Adam C. Ramos, P.O. Box 81; Charles Retherford, 1092 Palomino Rd., both of Cloverdale, CA (US) 95425

( * ) Notice: Subject to any disclaimer, the term of this patent is extended or adjusted under 35 U.S.C. 154(b) by 0 days.

(21) Appl. No.: 09/852,439

(22) Filed: May 9, 2001

(51) Int. Cl.[7] ................................................. B25B 7/22
(52) U.S. Cl. ................................ 7/125; 81/426; 81/487
(58) Field of Search ........................... 7/125, 157, 170, 7/900, 132; 81/415, 417, 418, 424.5, 426, 426.5, 44, 487

(56) References Cited

U.S. PATENT DOCUMENTS

| | | | |
|---|---|---|---|
| 354,313 A | 12/1886 | Galloway | |
| 1,300,495 A | 4/1919 | Shank | |
| 1,821,953 A | 9/1931 | White | |
| 2,457,689 A | 12/1948 | Krieg | |
| 2,842,997 A | 7/1958 | Wentling | |
| 3,336,825 A | * 8/1967 | Cashion | ...................... 81/426 |
| 3,859,874 A | 1/1975 | Joeckel | |
| 3,939,563 A | 2/1976 | Deike | |
| 4,017,958 A | 4/1977 | Diggs | |
| 4,796,318 A | 1/1989 | Bigei | |
| 5,207,014 A | 5/1993 | Panella | |

* cited by examiner

Primary Examiner—Eileen P. Morgan
Assistant Examiner—Joni B. Danganan
(74) Attorney, Agent, or Firm—Larry D. Johnson; Craig M. Stainbrook; Johnson & Stainbrook

(57) ABSTRACT

A tool that enables the forming of a hole in irrigation pipe, and the placement of an emitter device into that formed hole, includes a pair of elongate plier half-members connected at a pivoting joint. A first jaw includes an inwardly-directed hole punch member, while the second opposed jaw includes an inwardly-directed concavity to engage a piece of irrigation hose, such that closure of the jaws causes the hole punch to pierce a hole in the irrigation pipe. The jaw ends each include semi-cylindrical cavities sized to hold the cylindrical body of an emitter, to facilitate forcible insertion of the spike of the emitter into the hole previously formed in the irrigation pipe.

4 Claims, 3 Drawing Sheets

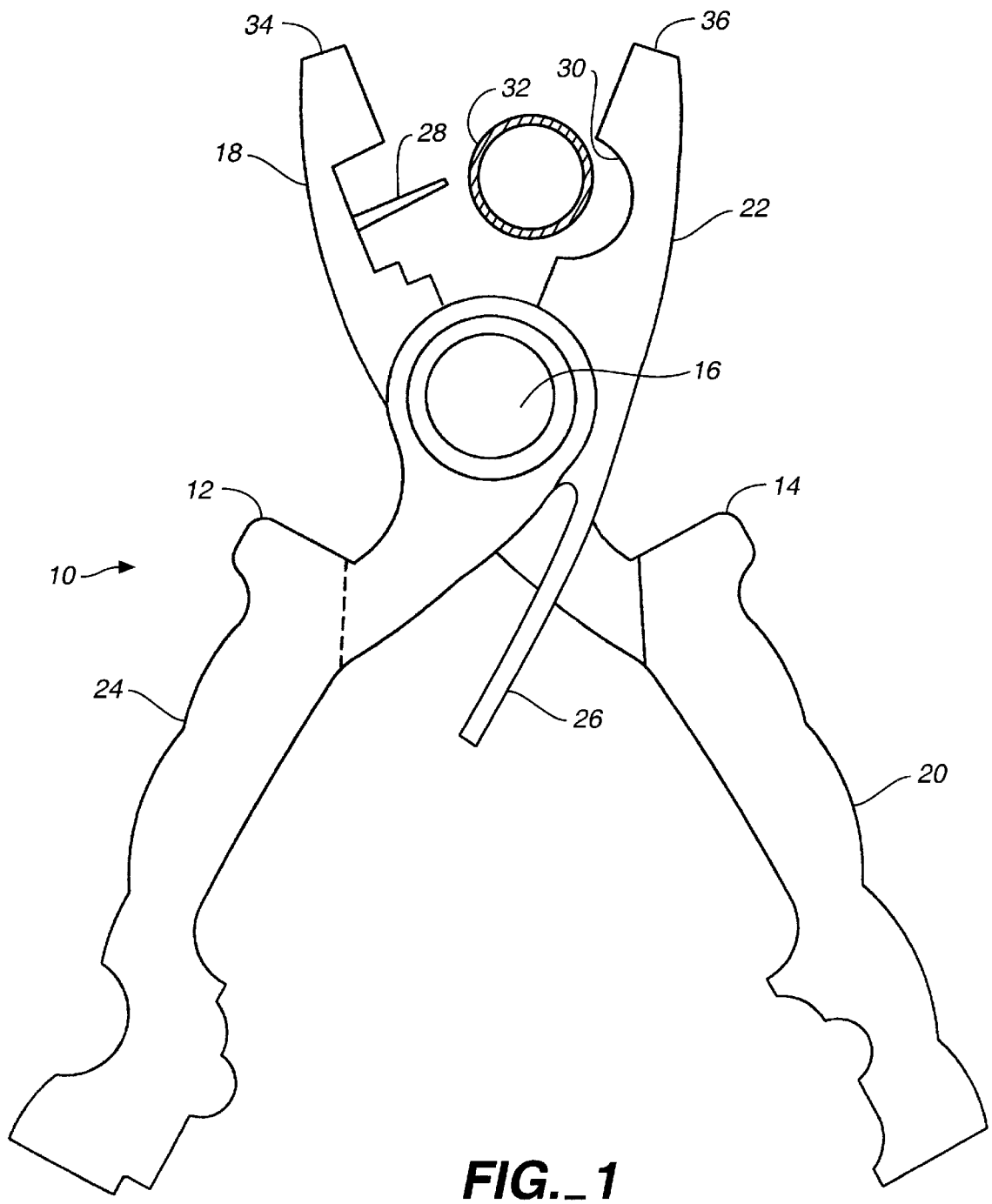
FIG._1

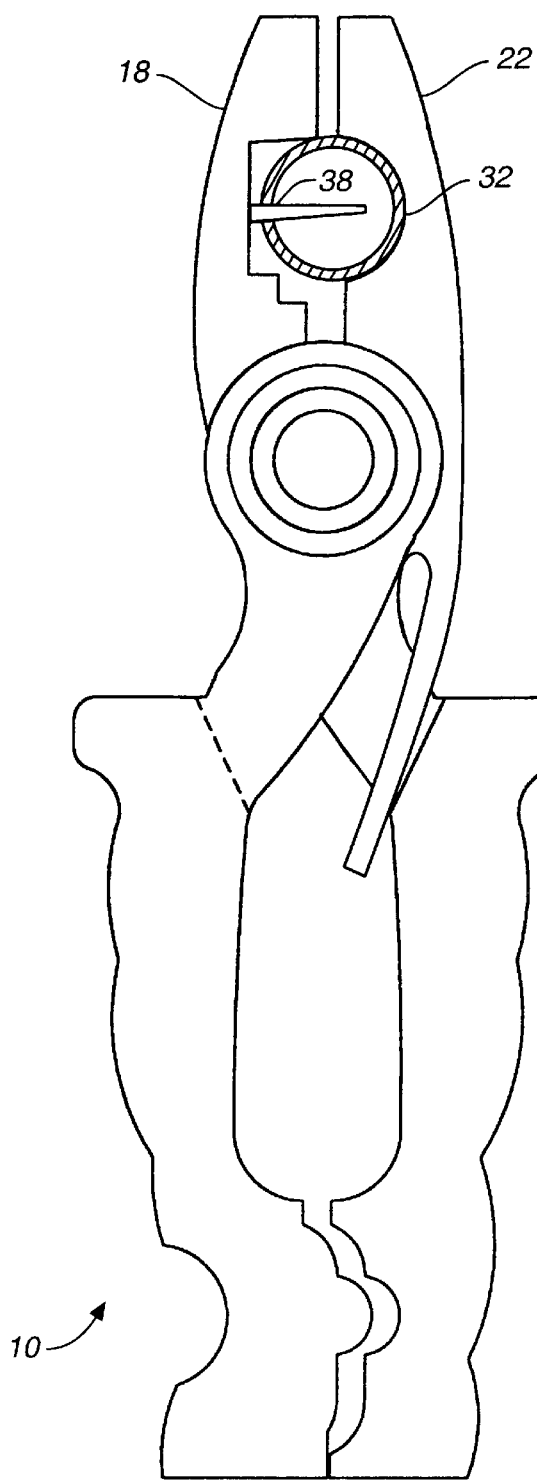
FIG._2
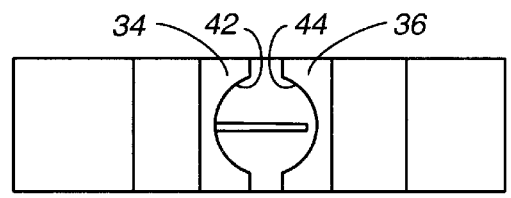
FIG._5
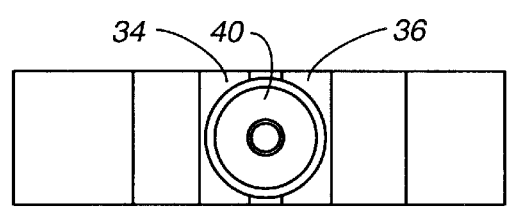
FIG._6

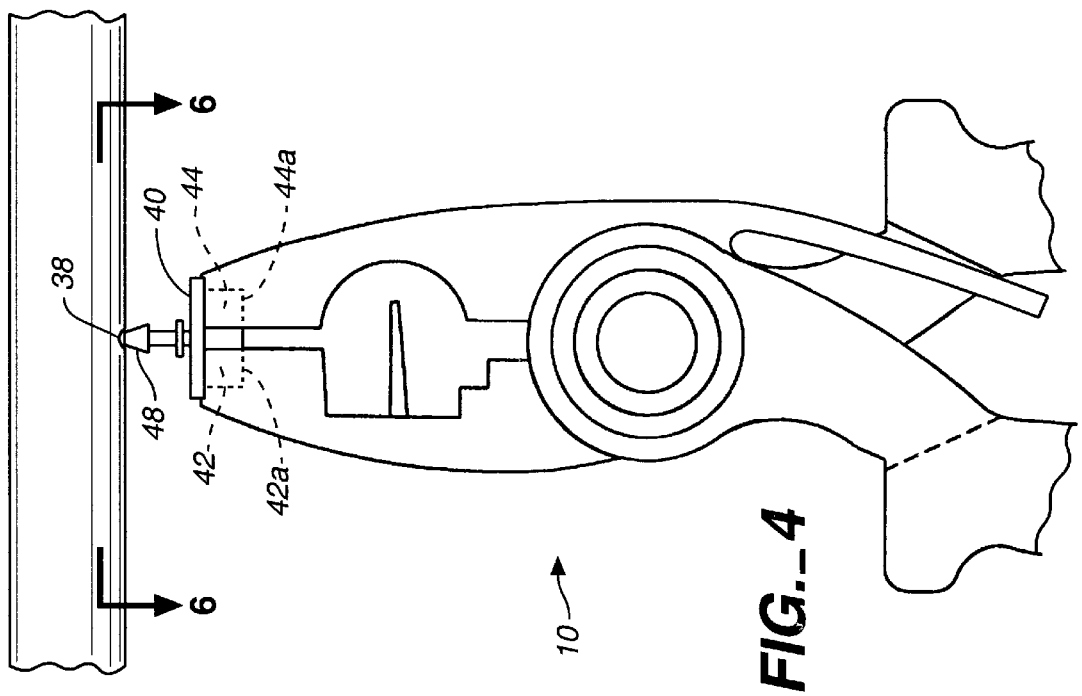
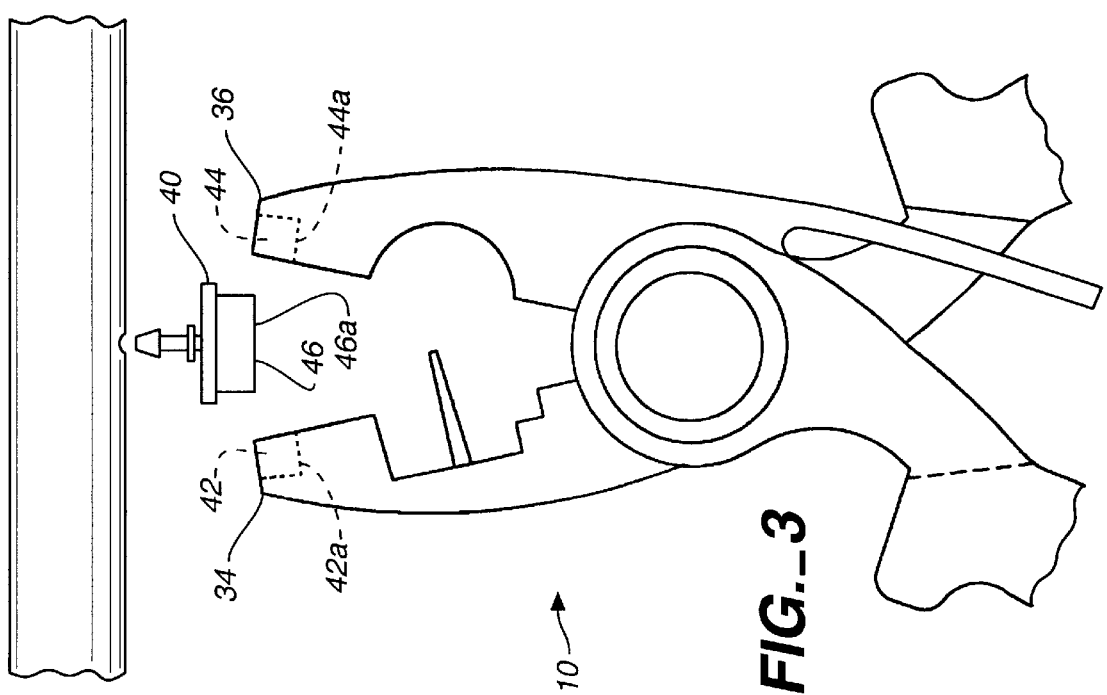

140
TOOL FOR INSTALLING EMITTERS FOR DRIP IRRIGATION

BACKGROUND OF THE INVENTION

1. Field of the Invention

This invention relates generally to tools and implements used in agriculture, and more specifically to an improved tool for the installation of emitter devices in drip irrigation systems.

2. Description of the Prior Art

Drip irrigation systems, such as those used in agriculture, are well known and in widespread use. Most such drip irrigation systems provide lengths of irrigation hose or pipe, into which a series of nozzle or emitter devices are installed in a spaced pattern to deliver the desired irrigation water at the appropriate points along the length of the pipe. Installation of these emitter devices into the irrigation pipe can, however, be an awkward and time-consuming task. Typically, the installation worker uses a tool such as a hole punch to first cut a hole in the irrigation pipe at a desired location, and then the worker must manually attempt to press the barbed spike of the emitter device into the hole. This process is then repeated at each emitter location along the length of the pipe, which may constitute thousands of emitters. This labor-intensive activity is extremely inefficient.

SUMMARY OF THE INVENTION

The tool for installing emitters for drip irrigation of this invention provides an improved tool that enables both the forming of a hole in irrigation pipe, and the placement of an emitter device into that formed hole. The tool includes a pair of elongate plier half-members connected at a pivoting joint, in the traditional manner of a pair of pliers. A first jaw includes an inwardly-directed hole punch member, while the second opposed jaw includes an inwardly-directed concavity of a size to engage at least a portion of the circumference of a piece of irrigation pipe, such that closure of the jaws around the irrigation pipe causes the hole punch to pierce a hole in one wall of the pipe. When used with cylindrical emitters, the jaw ends each include semi-cylindrical cavities sized and adapted to engage the cylindrical body of the emitter device when the jaws are brought together in juxtaposition, with the cylindrical cavity so formed terminating in a circular platen to press against the top surface of the emitter and facilitate forcible insertion of the barbed spike of the emitter into the hole previously formed in the irrigation pipe. These steps are then repeated for all the desired emitter locations along the length of the pipe.

BRIEF DESCRIPTION OF THE DRAWINGS

FIG. 1 is a front elevation view of the tool for installing emitters for drip irrigation of this invention in its open configuration, illustrating a segment of irrigation pipe having been placed into the jaws of the tool;

FIG. 2 is a front elevation view of the tool of FIG. 1 in its closed configuration, with the hole punch affixed to one of the jaws of the tool having pierced a hole in the irrigation pipe;

FIG. 3 is a cutaway front elevation view of the tool in its open configuration and having released the irrigation pipe, and preparing to grasp an emitter in the jaw ends and insert the emitter into the hole formed in the irrigation pipe;

FIG. 4 is a cutaway front elevation view of the tool in its closed configuration having captured the emitter in the jaw ends for forcible insertion of the emitter into the hole formed in the irrigation pipe;

FIG. 5 is a top plan view of the tool in its closed configuration; and

FIG. 6 is a top plan view of the tool in its closed configuration with an emitter captured in the jaw ends, this view taken along line 6—6 of FIG. 4.

DETAILED DESCRIPTION OF A PREFERRED EMBODIMENT

FIG. 1 is a front elevation view of the tool for installing emitters for drip irrigation of this invention in its open configuration. Tool 10 includes a pair of elongate plier half-members 12, 14, connected at a pivoting joint 16, in the traditional manner of a pair of pliers. Half-member 14 terminates at one end in a first jaw portion 18, and at its other end in a handle portion 20. Half-member 12 terminates at one end in a second jaw portion 22, and at its other end in a handle portion 24. Spring 26 may be connected to one of the half-members to normally bias the jaws apart, as is well known in the art of hand tools.

First jaw 18 includes an inwardly-directed hole punch member 28, while second jaw 22 includes an inwardly-directed semi-cylindrical concavity 30 that defines a hose receiver or "holder", of a size to engage at least a portion of the circumference of a piece of irrigation hose 32 (e.g., one-half inch hose). Each of the jaws 18, 22 has a jaw end 34, 36, respectively.

FIG. 2 is a front elevation view of the tool 10 in its closed configuration. The closure of the jaws 18, 22 causes hole punch 28 to pierce a hole 38 in the irrigation pipe 32. The hole punch 28, and the hole 38 created thereby, are of a size selected to form a suitable friction-fit with the spike portion of the emitter to be installed, as described herein.

FIG. 3 is a cutaway front elevation view of the tool 10 in its open configuration and having released the irrigation pipe 32, and preparing to grasp an emitter device 40 in the jaw ends 34, 36. The jaw ends 34, 36 each include semi-cylindrical cavities 42, 44, respectively, sized and adapted to engage and hold the cylindrical body 46 of emitter 40. Other cavity shapes could of course be used for use to conform with alternate emitter shapes.

FIG. 4 is a cutaway front elevation view of the tool 10 in its closed configuration having captured the emitter 40 in the semi-cylindrical cavities 42, 44 of jaw ends 34, 36 for forcible insertion of the spike 48 of emitter 40 into the hole 38 formed in the irrigation pipe 32. Each semi-cylindrical cavity 42, 44 terminates in a semicircular pressing surface or platen 42a, 44a so that the top surface 46 of the generally cylindrical emitter body 46 is pressed by the formed platen, pushing the emitter into the irrigation pipe. This platen 42a, 44a is positioned at an appropriate distance from the end of the jaws to prevent the emitter body from "sinking" to far into the jaws for proper insertion of the emitter spike into the pipe, i.e., the depth of the cylindrical cavity formed when the jaws are brought together is preferably less than or equal to the height of the emitter body.

FIG. 5 is a top plan view of the tool 10 in its closed configuration. This view illustrates the semi-cylindrical cavities 42, 44, formed in the jaw ends 34, 36, respectively, for capture of the emitter.

FIG. 6 is a top plan view of the tool 10 in its closed configuration, with an emitter 40 captured in the jaw ends 34, 36. After the emitter spike has been installed into the hole in the irrigation pipe, the tool can be pulled straight back and removed from the emitter and pipe without opening the tool jaws.

While this invention has been described in connection with preferred embodiments thereof, it is obvious that modifications and changes therein may be made by those skilled in the art to which it pertains without departing from the spirit and scope of the invention. For example, the inventive tool can be composed from steel, aluminum, or any other suitable material, and constructed by molding, forging, or the like. Accordingly, the scope of this invention is to be limited only by the appended claims and equivalents.

What is claimed as invention is:

1. A tool in combination with a pipe and an emitter, for installing a nozzle in a drip irrigation system, said combination comprising:
   a piece of irrigation pipe, said piece of irrigation pipe having a wall;
   an emitter member having a body portion and a spike portion; and
   a tool having a pair of elongate plier half-members connected at a pivoting joint, one of said plier half-members terminating in a first jaw portion having an inwardly-directed hole punch member, and the other of said plier half-members terminating in a second jaw portion having an inwardly-directed concavity to engage said piece of irrigation pipe, each of said jaw portions bearing jaw end cavities to engage said emitter body portion, and terminating in a platen to contact said emitter body portion, wherein closure of said jaws causes said hole punch member to pierce a hole in said wall of said irrigation pipe placed in said jaws, and capture of said emitter in said jaw end cavities facilitates forcible insertion of said spike portion of said emitter into the hole formed in said irrigation pipe.

2. The apparatus of claim 1 further including a spring portion to normally bias said first and second jaw portions apart.

3. The apparatus of claim 1 wherein each of said jaw end cavities are semi-cylindrical in shape.

4. The apparatus of claim 1 wherein said second jaw portion inwardly-directed concavity is semi-cylindrical in shape.

* * * * *